United States Patent
Tuomikoski

(10) Patent No.: US 6,220,455 B1
(45) Date of Patent: Apr. 24, 2001

(54) SCRAPER BAR ARRANGEMENT

(75) Inventor: Pekka Tuomikoski, Kaaro (FI)

(73) Assignee: Finnketju Invest Oy, Rauma (FI)

( * ) Notice: Subject to any disclaimer, the term of this patent is extended or adjusted under 35 U.S.C. 154(b) by 0 days.

(21) Appl. No.: 09/242,537

(22) PCT Filed: Jun. 6, 1997

(86) PCT No.: PCT/FI97/00352

§ 371 Date: Feb. 18, 1999

§ 102(e) Date: Feb. 18, 1999

(87) PCT Pub. No.: WO98/09892

PCT Pub. Date: Mar. 12, 1998

(30) Foreign Application Priority Data

Sep. 3, 1996 (FI) .......................................................... 963435

(51) Int. Cl.$^7$ .................................................. B01D 21/18
(52) U.S. Cl. .......................... 210/526; 210/541; 198/728; 198/731
(58) Field of Search ................................. 210/523, 525, 210/526, 561; 198/728, 731

(56) References Cited

U.S. PATENT DOCUMENTS

| | | | |
|---|---|---|---|
| 1,511,221 | * | 10/1924 | Joy . |
| 2,237,172 | * | 4/1941 | Briggs ................................ 210/525 |
| 2,494,534 | * | 1/1950 | Armstrong et al. ................ 210/526 |
| 2,717,548 | * | 9/1955 | Blair, Jr. . |
| 2,888,143 | * | 5/1959 | Seidenstricker ...................... 210/525 |
| 3,089,579 | * | 5/1963 | Beck . |
| 3,313,422 | * | 4/1967 | Swenson ............................. 210/526 |
| 3,394,816 | * | 7/1968 | Lowry ................................. 210/526 |
| 3,869,039 | | 3/1975 | Temme et al. ...................... 198/175 |
| 4,316,537 | * | 2/1982 | Rieger et al. ....................... 198/731 |
| 4,663,042 | * | 5/1987 | Rasper et al. ...................... 210/525 |
| 4,722,434 | | 2/1988 | Millington .......................... 198/731 |
| 4,747,481 | | 5/1988 | Gorlov et al. ...................... 198/731 |
| 4,950,398 | * | 8/1990 | Wiegand et al. ................... 210/526 |
| 5,431,818 | * | 7/1995 | Zickert .............................. 210/541 |

(List continued on next page.)

FOREIGN PATENT DOCUMENTS

| | | |
|---|---|---|
| 554 791 | 10/1974 | (CH) . |
| 26 04 792 | 8/1977 | (DE) . |
| 26 22 705 | 12/1977 | (DE) . |
| 30 21 922 | 12/1981 | (DE) . |

(List continued on next page.)

Primary Examiner—Christopher Upton
(74) Attorney, Agent, or Firm—Connolly Bove Lodge & Hutz, LLP

(57) ABSTRACT

Scraper bar arrangement to be used particularly in connection with a liquid handling reservoir, such as a clarification basin or like, which comprises one or several scraper bars (1) being placed one after another in the longitudinal direction (5), transfering means (2) for moving of the scraper bar/bars (1), such as two transmission chains (2b) or like being placed side by side and being driven by means of a drive wheel and turning wheel arrangement (2a) or accordingly, in connection with which the scraper bar/bars (1) is/are attached by means of an attachment arrangement (3), preferably removably, such as by a screw joint or like. The scraper bar (1) is formed known as such of at least two first bar parts (1a), that are fixed to the transfering means (2), such as to two transmission chains (2b) placed side by side, and of at least one second bar part (1b), that has been attached between the above by means of coupling means (4), that operate preferably by quicklocking principle, and locking means (5). The second bar part (1b) of the scraper bar comprises one at least partly hollow housing structure being preferably made of glassfiber, carbon fiber, composite material, ceramic material and/or like, that is arranged to be used preferably with at least two buffer heights (h1, h2), differing essentially from each other.

10 Claims, 6 Drawing Sheets

Figure 1:
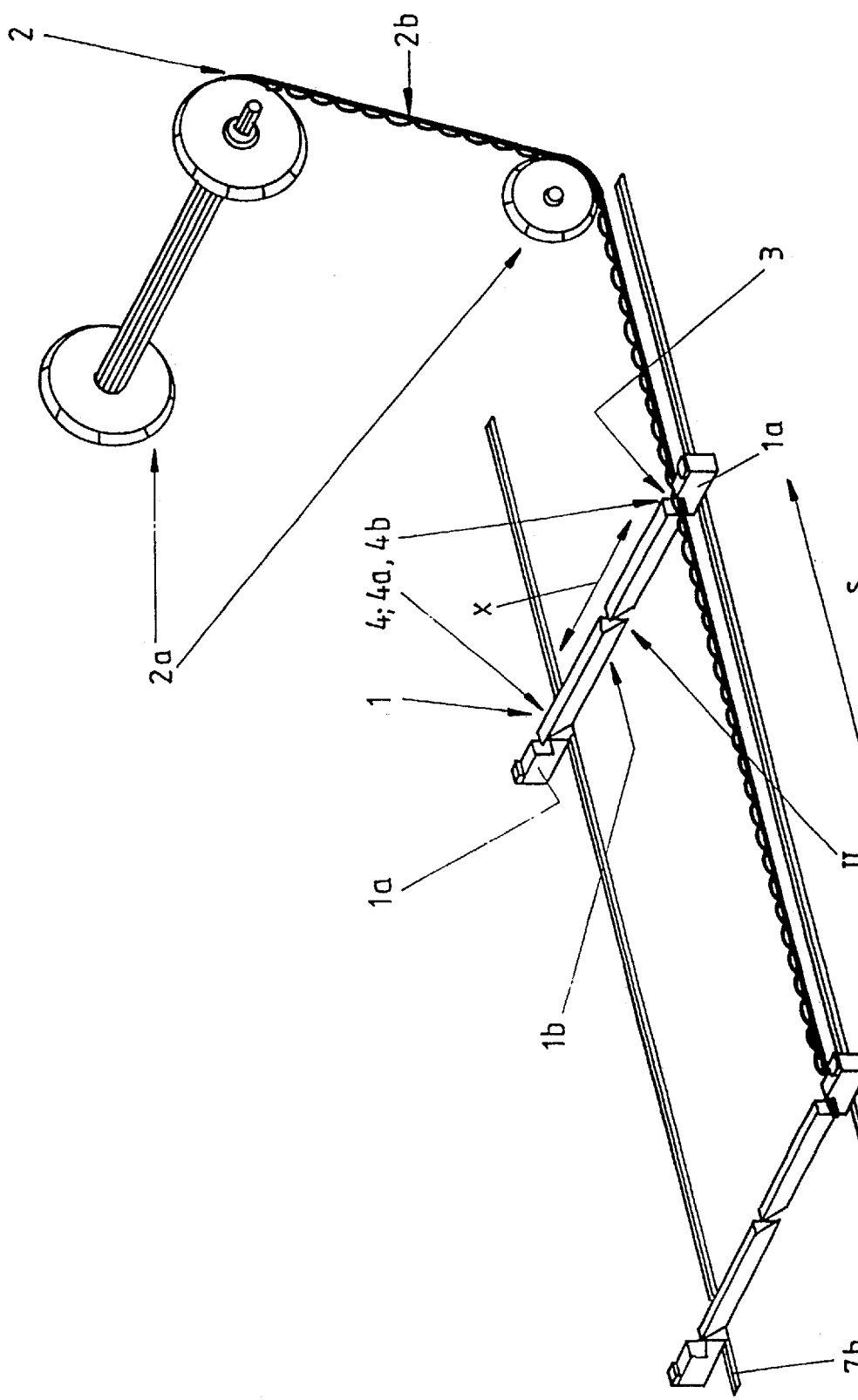

U.S. PATENT DOCUMENTS 5,511,649 * 4/1996 Wilcher ................................ 210/526
5,620,601 * 4/1997 Wilcher et al. ...................... 210/526
5,788,837 * 8/1998 Hannum ............................... 210/525

FOREIGN PATENT DOCUMENTS

| 2184603 | 12/1973 | (FR) . |
| 2 102 756 | 2/1983 | (GB) . |
| 2 133 763 | 8/1984 | (GB) . |

* cited by examiner

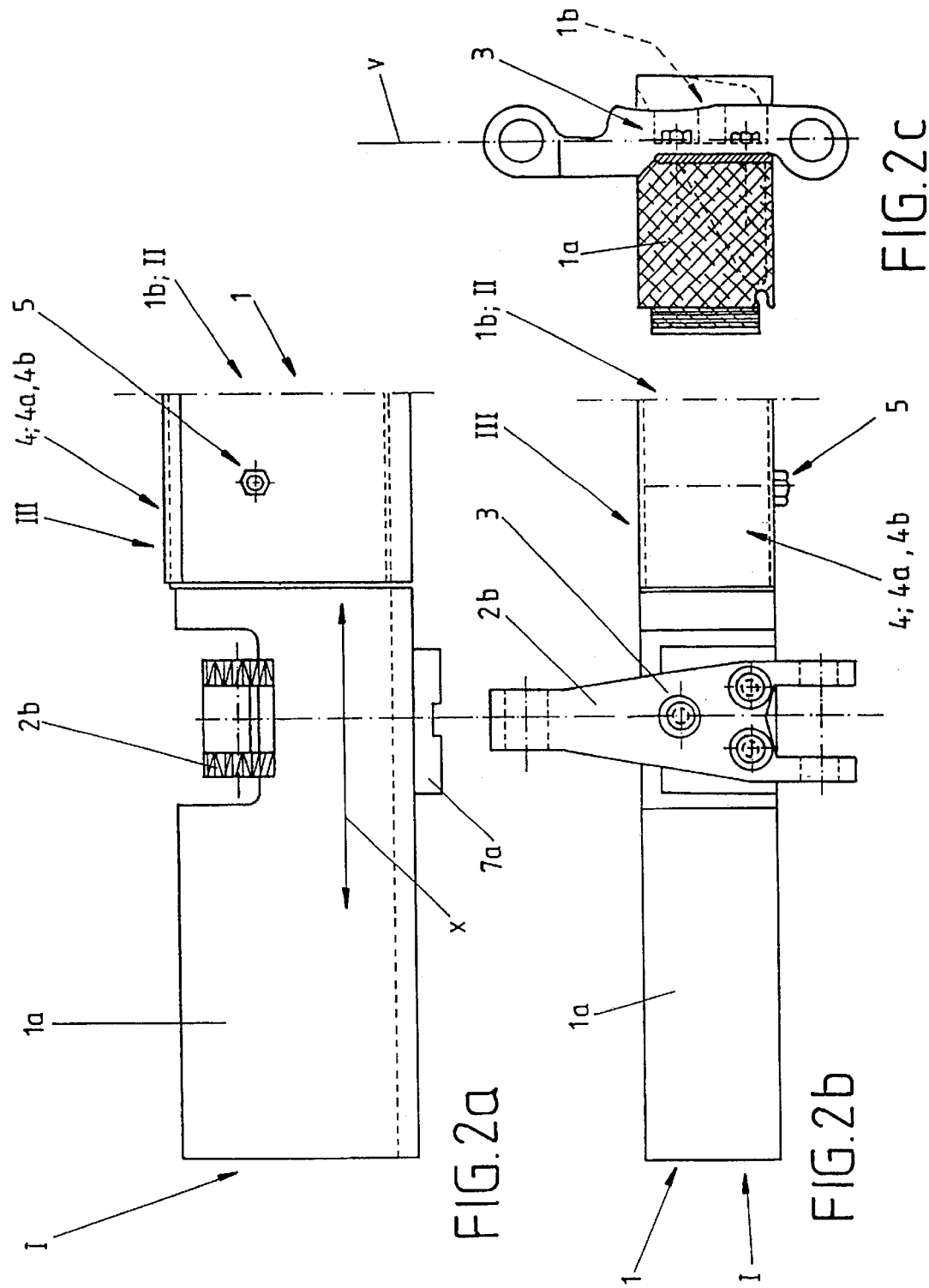

SCRAPER BAR ARRANGEMENT

FIELD OF THE INVENTION

The invention relates to a scraper bar arrangement to be used particularly in connection with a liquid handling reservoir, such as a clarification basin or like. The arrangement includes one or more scraper bars placed one after another in the longitudinal direction. The arrangement also includes transferring means for moving of the scraper bar/bars, such as two transmission chains or like placed side by side and driven by a drive wheel and turning wheel arrangement or accordingly. In connection with the transferring means the scraper bar/bars is/are attached by an attachment arrangement, preferably removably, such as by a screw joint or like.

BACKGROUND OF THE INVENTION

In the type of solutions presented above it is usual to arrange the scraper bars in a way, that they are being transfered by means of chains placed at the edges of the reservoir in a way, that they scrape in connection with the bottom material existing therewith to a sludge pocket and that they lead material correspondingly on the surface to a collecting chute, that goes cross the reservoir. In this connection, the scraper bars have been carried out by profiles, that are often made of, for example, fiberglass, and that are attached to the chains traditionally by a screw joint. A disadvantage of totally uniform scraper bars is particularly the troublesome installation of the same, whereby very accurate and careful installation measures are required, so that the holes to be made in the scraper bars are just in the right positions. This causes often several problems in practice, for example because of unevenness of the bottom of the clarification basin and because of other reasons as well. That is why the holes must often be left to be done on-site during installation. One disadvantage of the type of scraper bars described above is furthermore that, that they are placed always without exception totally one-sided in respect to the chains. That is why attachment of the same causes always resonance during use of the same as well as continuous bending moment through attaching arms being fixed to the back sides of the chains. That is why the chains tend to bend by the joints of the same during use. This naturally causes problems, when the scraper bars are aimed to be kept in a perpendicular position, for example against the bottom during use of the same. Additionally because of the reasons described above all service and maintenance measures, for example because of breakage of the scraper bars often cause long terminations for use. One crucial disadvantage of the type of scraper bars represented above is furthermore that, that they must be changed as a whole, that is very expensive when scraper bars, for example made of fiberglass are being used.

On the other hand from the following documents: U.S. Pat. No. 4,747,481, U.S. Pat. No. 4,722,434, CH 554 791 ja GB 2 133 763, it is previously known to exploit a bar entirety that is formed of bar parts to be connected to each other. All of the solutions being presented in the above documents are, however, conveyors, that are ment particularly for transfering of material, that is so called pusher or scraper conveyors. Due to deviating purposes of use in each solution above there has been exploited a so called link chain. The operating reliability of the link chain is particularly in the purpose of the invention in question most probably unsatisfying. In addition to that, when this type of chain is being used the drive and turning wheels must be replaced with very short intervals particularly because of wearing, that is due to those unproportionately high surface loads.

SUMMARY OF THE INVENTION

It is the aim of the scraper bar according to this invention to achieve a decisive improvement in the problems presented above and thus to raise substantially the level of knowledge in the field. To achieve this aim, the scrape bar according to the invention is primarily characterized in, that the scraper bar is formed known as such of at least two first bar parts. The first bar parts are fixed to the transfering means, such as to two transmission chains placed side-by-side. The scraper bar is also formed and of at least one second bar part that has been attached between the above by means of coupling means. The parts operate preferably by quick locking principle, and locking means. The second bar part of the scraper bar comprises one at least partly hollow housing structure being preferably made of glassfiber, carbon fiber, composite material, ceramic material and/or like, that is arranged to be used preferably with at least two buffer heights, differing essentially from each other.

As the most important advantages of the scraper bar arrangement according to the invention may be mentioned simplicity and reliability of construction, use and principle of the same. Additionally installation stages as well as later service and maintenance measures of the scraper bar are very pronounced and easy to carry out. Also, the costs due to maintenance of the scraper bar arrangement may be minimized by changing advantageously only the first bar parts belonging to the scraper bars. That may be carried out, for example by wooden structures at the cheapest. In this case the most remarkable part of the scraper bar arrangement that is the middle parts of the scraper bars acting as the actual scrapers, which are not very often being harmed in practice during normal use, may be kept in use continuously. Furthermore, one crucial advantage relating to the invention is that, that the draw line (see FIG. 2c) of the chain may be adjusted in respect to the scraper bar, in which case resonance being typical for traditional scraper bars may be avoided.

The operating reliability of the scraper bar arrangement may be furthermore improved by using a support arrangement that guides movement of the chain particularly at the turning wheel, whereby, for example, skipping of the chain in most heterogeneous circumstances and in most heterogeneous clarification basin applications may be efficiently prevented, despite even careless or unprofessional upkeeping of the process.

Advantageous embodiments of the scraper bar arrangement according to the invention are described below in relation to the scraper bar arrangement.

BRIEF DESCRIPTION OF THE INVENTION

Figure 4A:
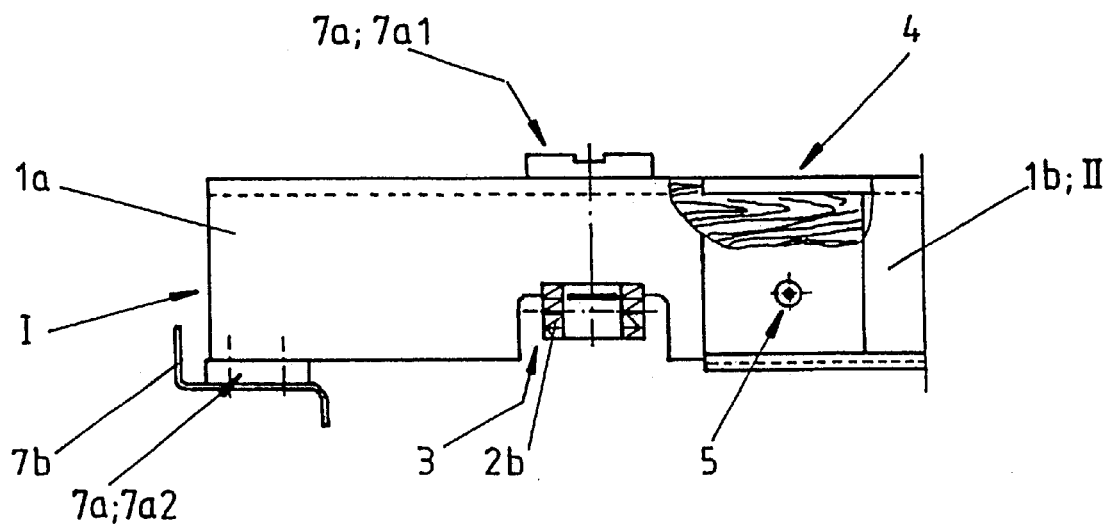
Figure 4B:
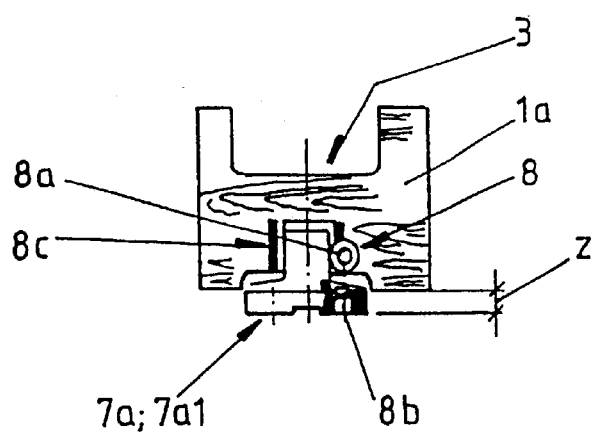
Figure 5:
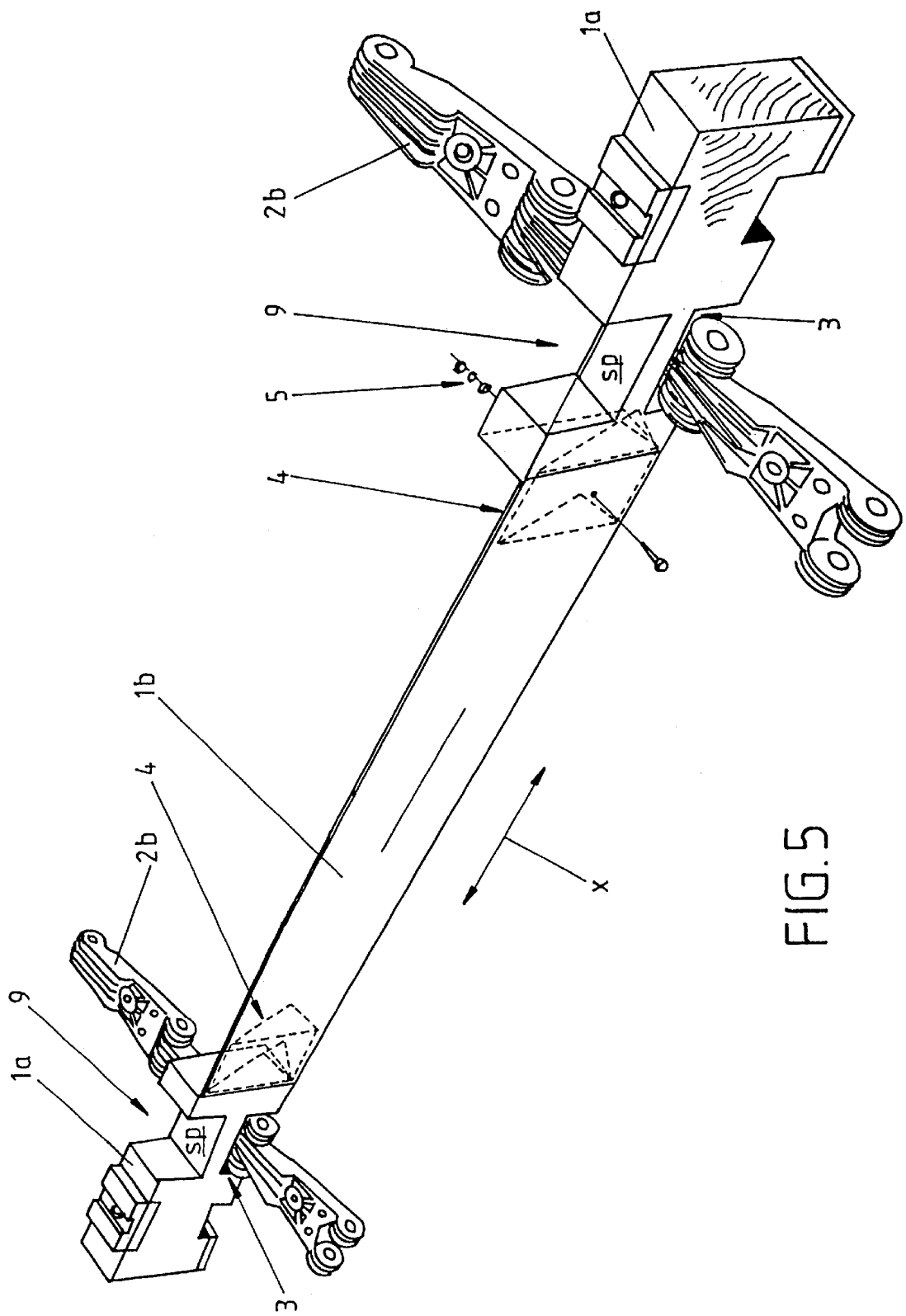
Figure 6:
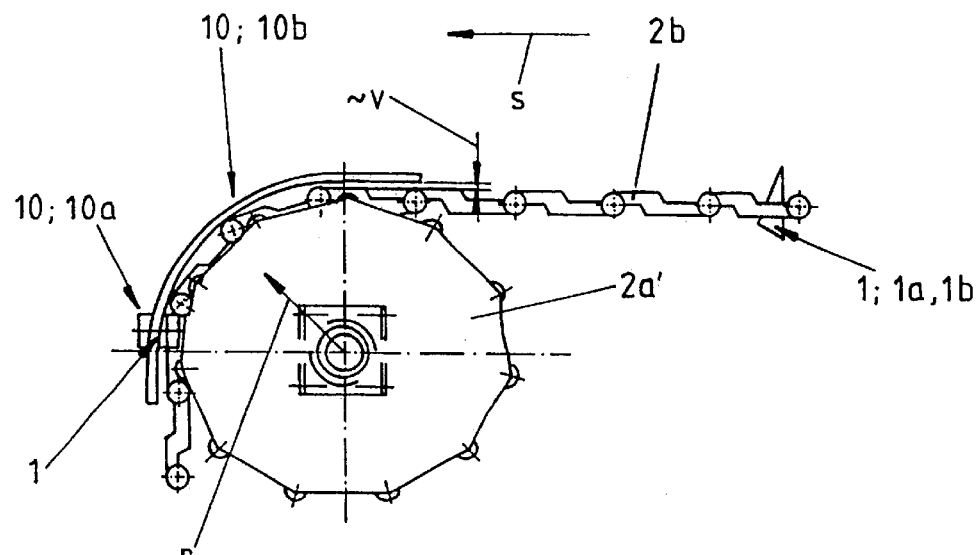
Figure 7:
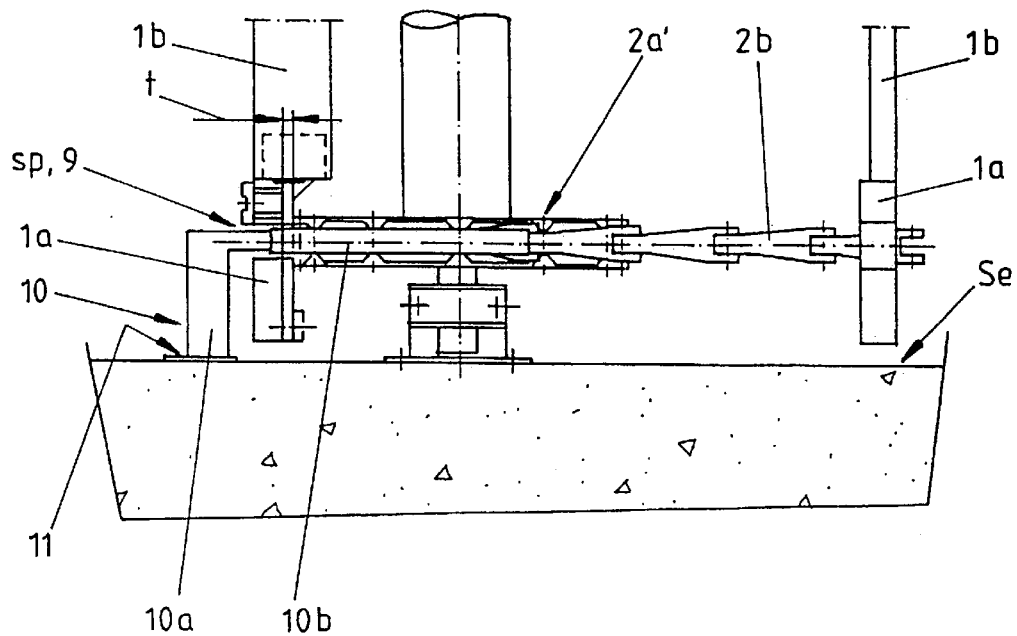

In the following description, the invention is illustrated in detail with reference to the appended drawings. In the drawings, FIG. 1 shows a principal perspective view of the operating principle of an advantageous scraper bar arrangement according to the invention, FIGS. 2a, 2b and 2c show the jointing point of an advantageous scraper bar according to the invention and power transmission chain seen from the front, seen from above and as a cross section, FIGS. 3a and 3b show as a cross section an advantageous second bar part according to the invention being used in connection with the coupling means existing in the first bar part and FIGS. 4a and 4b show as an advantageous embodiment slide part arrangements existing in connection with the scraper bar according to the invention, FIG. 5 shows as a perspective view composition of a scraper bar arrangement, that has been equipped as an advantageous embodiment with a support arrangement, FIG. 6 shows furthermore a side view of an advantageous support part solution, and FIG. 7 shows the corresponding embodiment shown in FIGS. 6 seen from above.

DETAILED DESCRIPTION OF THE INVENTION

The invention relates to a scraper bar arrangement to be used particularly in connection with a liquid handling reservoir, such as a clarification basin or like. The scraper bar includes one or, more scraper bars 1 placed one after another in the longitudinal direction. Transfering means 2. Is included for moving of the scraper bar/bars 1. The transferring means may include two transmission chains 2b or like being placed side by side and being driven by means of a drive wheel and turning wheel arrangement 2a or accordingly, in connection with which the scraper bar/bars 1 is/are attached by means of an attachment arrangement 3, preferably removably, such as by a screw joint or like. The scraper bar 1 is formed known as such of at least two first bar parts 1a, that are fixed to the transfering means 2, such as to two transmission chains 2b placed side by side, and of at least one second bar part 1b, that has been attached between the above by means of coupling means 4, that operate preferably by quick locking principle, and locking means 5. The second bar part 1b of the scraper bar comprises one at least partly hollow housing structure being preferably made of glassfiber, carbon fiber, composite material, ceramic material and/or like, that is arranged to be used preferably with at least two buffer heights h1, h2, differing essentially from each other.

Figure 3A:
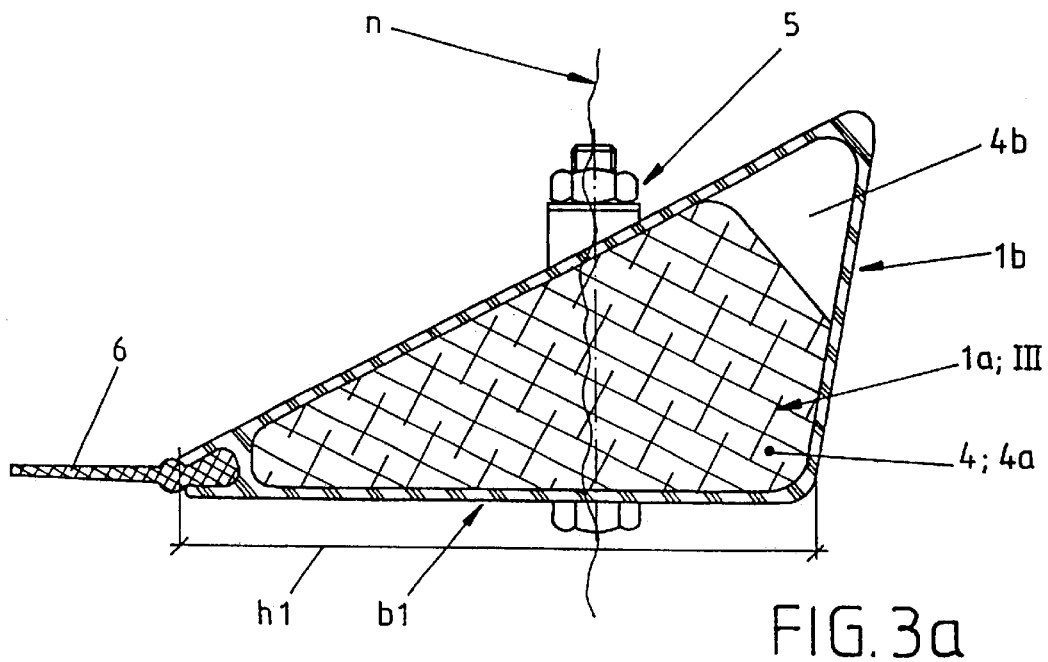
Figure 3B:
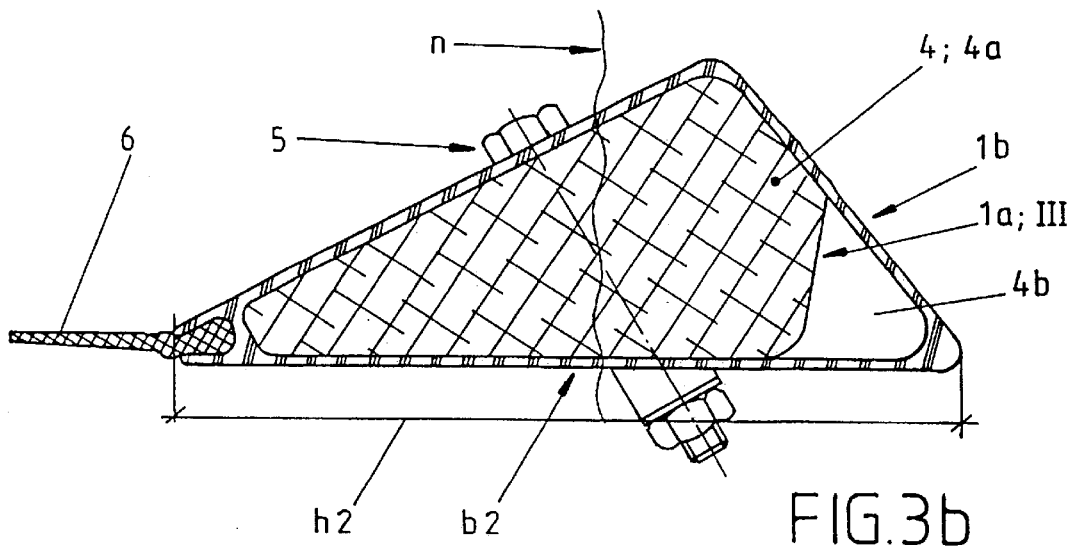

Furthermore with reference e.g. to FIGS. 3a–3b to the scraper edge of the scraper bar 1 there has been arranged a flexible edging strip 6, that is made of rubber lastics and/or like and being attached therewith removably with such as a form fit. The cross second of the second bar part 1b is arranged as a polygon, such as a triangle or like, to achieve at least two buffer sides p1, p2, the heights of which differ essentially from each other.

Furthermore with reference particularly to FIGS. 3a–3b the first organs 4a of the coupling means 4 at the second end III of the first bar part 1a comprise a coupling projection. The cross section of the coupling projection corresponds at least partly the cross section of the coupling recess of the second bar part 1b, which enables use of the second bar part 1b in at least two positions with buffer sides p1, p2 differing essentially from each other. With further reference to FIGS. 3a–3b the first organs 4a of the coupling means 4 existing at the second end III of the first bar part 1a are arranged to close the end of the second bar part 1b, which remains open above the fluid level n, by arranging the coupling projection 4a to reach in the coupling recess 4b, that is formed by the essentially open end of the second bar part 1b, from the strip edge essentially above the fluid level n. In this way, entering of air inside the second bar part 1b of the scraper bar, when the same rises from the bottom of the fluid handling reservoir to the surface of the same.

With reference particularly to FIGS. 1, 4a and 4b in connection with the scraper bar 1 there has been arranged slide/wearing pieces 7a preferably made of rubber, plastics, ceramic and/or like and at corresponding points in the liquid reservoir slide bars 7b preferably made of metal, plastics and/or like.

As an advantageous embodiment in the solution shown in FIG. 4a and in greater detail in FIG. 4b the projection z of a first slide/wearing piece 7a1, existing in the first bar part 1a advantageously essentially at the point of attachment arrangement 3, is arranged adjustable by means of adjustment means 8. The corresponding principle may naturally be exploited in connection with the second slide/wearing piece 7a2, being placed essentially at the first end I of the first bar part as well. According to the principle shown in FIG. 4b the adjustment means 8 are arranged by carrying out attachment of the slide/wearing piece 7a1 (and/or 7a2) by quick locking principle, such as by means of eccentric, form fit, screw locking principle and/or correspondingly. In the presented view, an entirety formed of all the above characteristics has been exploited, whereby the position of the eccentric 8a is being adjusted by screw 8b and the height of the slide/wearing piece 7a1 is being altered by altering the front edge of the same in respect to the form fit locking surface 8c.

Furthermore as an advantageous embodiment a support arrangement is being used in connection with the scraper bar arrangement, that is meant particularly to prevent loosening of the chain 2b in the radial direction r from the drive wheel 2a' or a so called skipping of the same. In this case, the support part 10 belonging to the same has been placed according to FIGS. 6 and 7 essentially at the point of the drive wheel 2a' and in the radial direction r advantageously with a clearance v from the back surface of the chain 2b and/or the scraper bar 1. The support part 10 has been attached fixedly by means of fastening means 11 to the fluid reservoir, such as to the side wall Se of the same. Support part 10 reaches essentially over the whole contact surface between the chain 2b and the drive wheel 2a'.

As an advantageous embodiment with reference to FIGS. 5–7 particularly to enable bringing the support part 10 as close as possible to the back part of the chain 2b, to the back surface of the first bar part 1a there has been arranged a radial recess 9, which eables bringing of the support part 10 essentially in connection with the back surface of the chain 2b. As shown particularly in FIG. 7 the thickness t of the first bar part 1a at the point of the recess 9 is arranged in a way such that the back surface sp of the same that has been narrowed radially r unites essentially with the level corresponding the back surface of the chain 2b. Stabilization of movement of the scarper bars 1, for example in connection of the drive wheel 2a' is achieved particularly thanks to the above, because the support part 10 supports evenly each scarper bar 1 going over the drive wheel preventing, thus, let. Alone, for example so called skipping, but swinging of the scraper bar as well.

In the embodiments shown in FIGS. 6 and 7, the support part 10 is attached advantageously with point fastening principle at one single point to the side wall Se of the fluid reservoir by means of an attachment frame 10a, whereby the actual support surface 10b of the support part is arranged by means of an arch connected to the same or belonging built-in to the same, that follows evenly with a clearance v the back surface of each scraper bar 1 bending over the drive wheel and thanks to the structure represented above in principle with a corresponding clearance the back surface of the chain 2b, as well, over the entire contact between the parts.

In connection with the support part 10 there has been arranged advantageously observing means, also, to observe power influence directed to the same. The observing means are connected to the power arrangement driving the chain, particularly to interrupt moving of the chain 2b during a power influence bigger than the critical load being set for the support part 10. The applications mentioned above are not represented in greater detail with reference numbers, because very usual automatics may be exploited in this connection.

It is obvious that the invention is not limited to the embodiments presented or described above, but it can be modified within the basic idea even to a great extent. First of all, it is possible to produce the parts belonging to the scraper bars of most heterogeneous geneous materials, exploiting most heterogeneous manufacturing methods. As explained above, it is possible to produce the first bar parts of the scraper bar, for example of wood, and the second bar part only of more expensive material, for example, of fiberglass. In this connection it is naturally possible to exploit carbon fiber, composite materials, also, or even ceramic materials let alone metals. As the chain profile, it is furthermore possible to exploit most heterogeneous profiles, though the chain profile being exploited in the presented applications and developed by the applicant offers many kinds of advantages particularly thanks to that, that attachment of the scraper bars is carried out by means of a direct screw attachment directly to the back part of the shaped piece belonging to the chain. For example, when a so called bicycle chain type chain is being used an angle part or the like must be used, that is fixed to the back of the chain, to which merely attachment of the scraper bar causes torque, that is why this kind of solution is not nearly as efficient and reliable as the type of chain being represented above. Naturally, it is furthermore clear, that the scraper bar arrangement according to the invention may be exploited in most heterogeneous connections deviating from the type of applications described above e.g. for transfering of particle like material or for corresponding purposes.

What is claimed is:

1. A scraper bar arrangement, comprising:

at least one scraper bar;

a transmission means attached to the at least one scraper bar for moving the at least one scraper bar, the transmission means comprising two transmission chains arranged side-by-side, the transmission means further comprising a drive wheel and turning wheel for driving the transmission chains;

an attachment means for attaching the at least one scraper bar to the transmission chains; and a support means for preventing loosening of the transmission chains in a radial direction from the drive wheel, the support means comprising two support parts that each cover essentially the whole contact surface between separate ones of the transmission chains and the drive wheel.

2. The scraper bar arrangement according to claim 1, wherein the support parts are arranged with a clearance from a back surface of the transmission chains and the at least one scraper bar.

3. The scraper bar arrangement according to claim 1, wherein the support parts are fixedly attached by fastening means to a fluid reservoir.

4. The scraper bar arrangement according to claim 3, wherein the support parts are attached to a sidewall of the fluid reservoir.

5. The scraper bar arrangement according to claim. 1, wherein at least two first bar parts and a radial recess have been arranged at a back surface of the first bar parts to bring the support parts in contact with a back surface of the transmission chains and the at least one scraper bar.

6. The scraper bar arrangement according to claim 5, wherein a thickness of the first bar parts at a point of the radial recess is arranged in a way such that a back surface of the first bar parts that has been narrowed radially unites essentially with the level corresponding to the back surface of the transmission chains.

7. The scraper bar arrangement according to claim 1, further comprising:

an attachment frame for attaching each support part at a separate point to a side wall of the fluid reservoir, whereby an actual support surface of each support part is arranged by means of an arch associated with each support part.

8. The scraper bar arrangement according to claim 1, further comprising:

observing means connected to one of the support parts for observing power influence directed to the support part.

9. The scraper bar arrangement according to claim 8, wherein the observing means is connected to a power arrangement driving the transmission chains.

10. The scraper bar arrangement according to claim 9, wherein the observing means interrupts movement of the transmission chains during a power influence bigger than a critical load being set for the support parts.

\* \* \* \* \*